US009215252B2

(12) United States Patent
Smith et al.

(10) Patent No.: US 9,215,252 B2
(45) Date of Patent: Dec. 15, 2015

(54) METHODS AND APPARATUS TO IDENTIFY PRIVACY RELEVANT CORRELATIONS BETWEEN DATA VALUES

(71) Applicant: Intel Corporation, Santa Clara, CA (US)

(72) Inventors: Ned M Smith, Beaverton, OR (US); Nathan Heldt-Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 14/128,419

(22) PCT Filed: Sep. 27, 2013

(86) PCT No.: PCT/US2013/062087
§ 371 (c)(1),
(2) Date: Dec. 20, 2013

(87) PCT Pub. No.: WO2015/047287
PCT Pub. Date: Apr. 2, 2015

(65) Prior Publication Data
US 2015/0096043 A1   Apr. 2, 2015

(51) Int. Cl.
*G06F 7/04* (2006.01)
*G06F 17/30* (2006.01)
*H04N 7/16* (2011.01)
*H04L 29/06* (2006.01)
*G06F 21/60* (2013.01)
*H04L 9/00* (2006.01)
*G06F 21/62* (2013.01)
*G06Q 10/00* (2012.01)

(52) U.S. Cl.
CPC ............... *H04L 63/20* (2013.01); *G06F 21/60* (2013.01); *G06F 21/6245* (2013.01); *G06Q 10/00* (2013.01); *H04L 9/00* (2013.01); *H04L 63/0407* (2013.01)

(58) Field of Classification Search
CPC .............................. H04L 29/06; G06F 21/60
USPC ........................................................ 726/26
See application file for complete search history.

(56) References Cited

U.S. PATENT DOCUMENTS

| | | | |
|---|---|---|---|
| 2001/0049620 | A1 | 12/2001 | Blasko |
| 2008/0209568 | A1* | 8/2008 | Chang et al. ............ 726/26 |
| 2009/0259494 | A1 | 10/2009 | Feder et al. |

(Continued)

OTHER PUBLICATIONS

Charu, C; A Condensation Approach to Privacy Preserving Data Mining; IBM; Year: 2008; pp. 1-8.*

(Continued)

*Primary Examiner* — Monjour Rahim
(74) *Attorney, Agent, or Firm* — Hanley, Flight & Zimmerman, LLC

(57) ABSTRACT

Methods, apparatus, systems and articles of manufacture are disclosed to identify privacy relevant correlations between data values. An example disclosed apparatus includes a principal monitor to identify a first privacy value associated with a first principal, a tuple manager to build a probability tuple matrix comprising a first tuple and a plurality of second tuples, the first tuple including the first principal and the associated first privacy value, and an Eigenvector engine to evaluate the probability tuple matrix to identify a dominant Eigenvector indicative of a correlation between the first privacy value and one of the plurality of second tuples.

28 Claims, 7 Drawing Sheets

(56) References Cited

U.S. PATENT DOCUMENTS

2011/0302144 A1 12/2011 Hamilton, II et al.
2012/0117006 A1 5/2012 Sathish
2013/0054593 A1 2/2013 Park et al.

OTHER PUBLICATIONS

Wikipedia, "PageRank,", retrieved from <http://en.wikipedia.org/w/index.php?title=PageRank&printable=yes>, retrieved Jun. 13, 2013 (18 pages).

Wikipedia, "EigenTrust," retrieved from <http://en.wikipedia.org/w/index.php?title=EigenTrust&printale=yes>, retrieved Jun. 13, 2013 (3 pages).

International Searching Authority, "The International Search Report and the Written Opinion," issued in connection with International Patent Application No. PCT/US2013/63087, mailed Jun. 27, 2014 (11 pages).

* cited by examiner

METHODS AND APPARATUS TO IDENTIFY PRIVACY RELEVANT CORRELATIONS BETWEEN DATA VALUES

FIELD OF THE DISCLOSURE

This disclosure relates generally to disclosing information, and, more particularly, methods and apparatus to identify privacy relevant correlations between data values.

BACKGROUND

In recent years, the number of people who participate in on-line communities (e.g., web users, social media users, on-line shoppers, etc.) has increased. Such participants typically provide some information to a third party on the Internet in exchange for one or more services. In some examples, the information provided to the third party helps facilitate the one or more services and/or allows the third party to improve its ability to provide the one or more services. For example, if the third party sends information to the participant(s) regarding future service opportunities (e.g., sales, product promotion(s), discount(s), etc.), then the information provided by the participant to the third party may result in such future service opportunity in a manner focused on the interest(s) of the participant.

DETAILED DESCRIPTION

Figure 1:
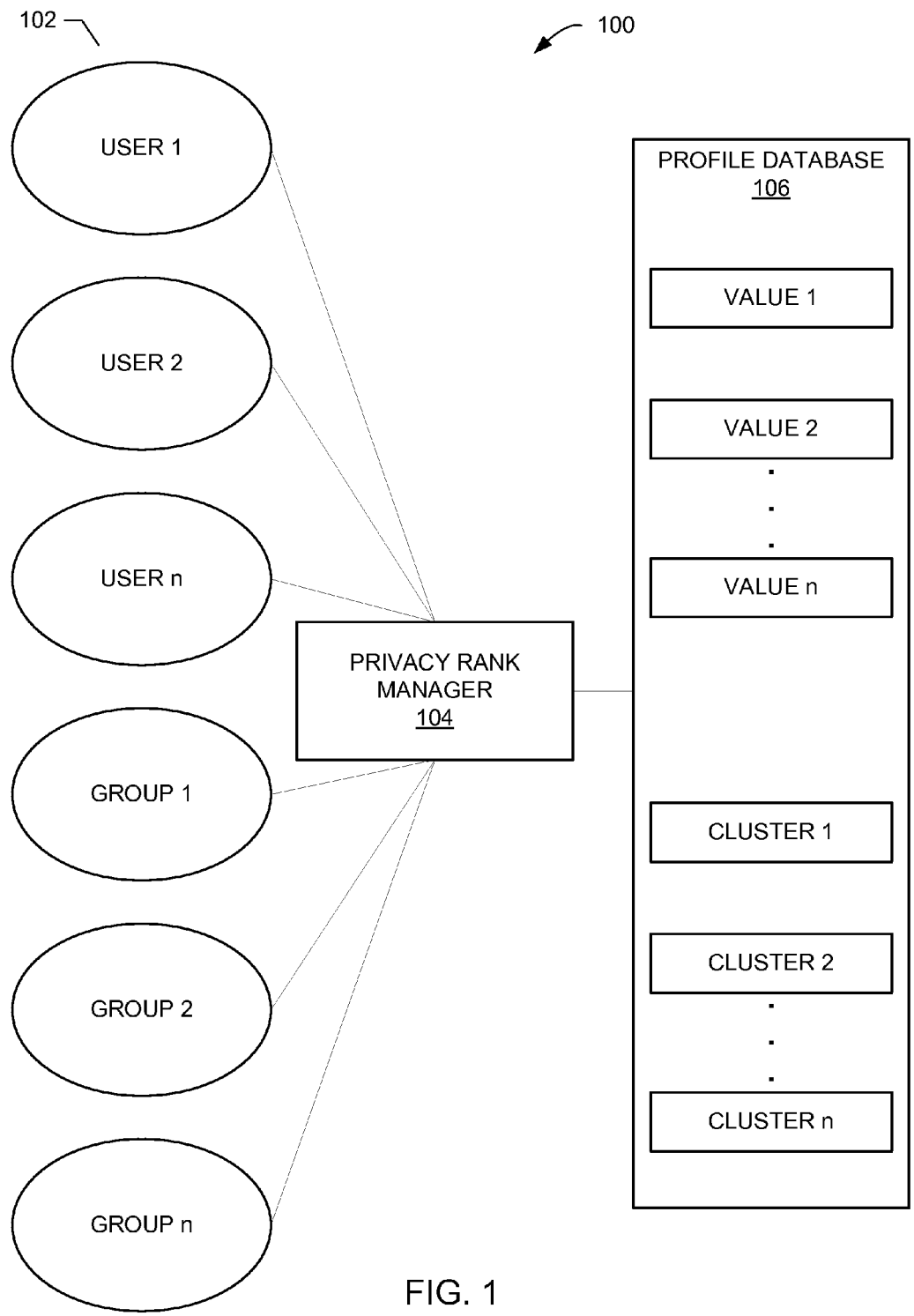
FIG. 1 is a schematic illustration of an example privacy rank system constructed in accordance with the teachings of this disclosure to identify privacy relevant correlations between data values.

As consumers and other participants of on-line communities (hereinafter referred to herein as "users") interact with third parties, an amount of data unique to such users becomes publically available. Third parties may include, but are not limited to, social media services (e.g., engaged via one or more web pages/sites, via mobile telephone applications (apps), etc.), on-line merchants (e.g., merchant websites), survey requests, and/or membership cards (e.g., preferred shopping cards). In addition to the information voluntarily provided by the users to one or more third parties, each receiving entity may generate and/or otherwise cultivate information about each user. For example, a third party may characterize user behavior by tracking a number of times a user visits a store, a number of times a user visits a website, a list of products purchased, an average amount of money spent per visit, etc. Generally, such collected/cultivated information reveals a degree of granularity of user habits, user preferences and/or user behaviors.

Collected information from users may be utilized by third parties for one or more contextual computing purposes. Generally speaking, contextual computing refers to the application of disparate information in a manner that reveals more robust composite information. For example, if a user reveals his or her gender, this information will not lead to a privacy security concern because the membership within either a "male" category or a "female" category is very large. Generally speaking, the larger a category is (e.g., a population of users that may belong to a category), the lower the risk of being uniquely identified and/or otherwise singled-out among a population. On the other hand, identification information in which a relatively small number of people share may result in a greater ability for a third party to distinguish a single user from a given population.

Additionally, if the user reveals a birth date, then the risk of privacy security is still relatively low because every individual within the population falls within one of 365 potential days of the year. Further still, if the user reveals his or her zip code, the corresponding risk of privacy security is relatively low because a zip code typically includes thousands of people. However, the contextual aggregation (combination) of these three disparate pieces of information results in a context of information that identifies a person to a degree of granularity deemed private.

As users continue to provide disparate pieces of information to third party entities, such entities may be able to apply contextual computing methodologies to derive additional information about each user. Such additional information may allow one or more third party entities to target the user with advertising materials that are more relevant and/or likely to result in a purchase decision. However, such additional information may also encroach upon a degree of privacy that one or more users deem uncomfortable and/or excessive.

In some examples, a user is a member of Facebook®. To obtain the Facebook® account, the user provided a name, an e-mail address and a residential address. With only a name, an e-mail address and a residential address, one or more merchants associated with Facebook advertising may target the user with advertising tailored based on this limited information, which may include general demographics associated with the residential address and/or cultural assumptions/heuristics associated with the provided name. However, in the event the user clicks and/or otherwise selects a "like" icon associated with a dimension, then this additional piece of information is added to a collection of other information associated with that user. As used herein, a dimension is a type of information that can be associated with a user, such as one or more attributes of a user. Types of dimensions include, but are not limited to, a name, an age, a gender, a preference (e.g., a preference for a car model, food product, etc.), a medical condition, a hair color, and/or an ownership status (e.g., whether the user owns a truck, a car, a cell phone, a particular computing device, etc.). Additionally, a dimension may include context data, such as information related to an ambient temperature associated with the user, a current velocity of the user, a current location of the user, a historical trend of locations associated with the user, etc. The term dimension is sometimes referred to herein as a "privacy value (V)," a "value," or an "attribute."

In some examples, a dimension may be expressed as a tuple containing information that associates a particular user(s) with one or more corresponding attributes. In other examples, the tuple may reflect an attribute and a corresponding size of a population that shares the particular attribute. As described above, membership size for a dimension is indicative of a potential privacy risk because relatively large groups yield a lower ability to uniquely identify a single user, whereas relatively small groups afford a better ability to uniquely identify a single user.

Methods, systems, apparatus and/or articles of manufacture disclosed herein calculate a privacy relevance of a given dimension by, in part, determining how many other users share the dimension. Additionally, a correlation between two or more dimensions is calculated by example methods, systems, apparatus and/or articles of manufacture disclosed herein to reveal a score of the privacy relevance based on normalizing a probability of uniqueness for the different types of dimensions that are associated with a user. In some examples, unnamed dimensions having a relatively strong/high correlation may be identified by example methods, systems, apparatus and/or articles of manufacture disclosed herein. In the event two or more dimensions exhibit a particularly high probability of co-occurrence, example methods, systems, apparatus and/or articles of manufacture disclosed herein generate a cluster.

For example, some dimensions exhibit relatively strong correlations and comport with expectations of well-known consumer behaviors, such as purchasing eggs with bread and cheese from convenience stores on Saturday mornings. As such, a user that happens to purchase eggs and bread may also exhibit a relatively high likelihood of purchasing cheese, thereby resulting in a cluster of dimensions. In other words, a marketing entity having the knowledge that a consumer has purchased eggs and bread on a Saturday morning (e.g., information obtained via a preferred shopping card transaction) can utilize such information to generate targeted advertising to that consumer for one or more cheese products. However, some dimensions exhibit relatively strong correlations that may not fall within well-known expectations of consumer behavior, such as male grocery store shoppers that purchase women's razors are strongly correlated to cyclists. Given this example correlation, one or more third party marketing entities may target such grocery store shoppers with advertisements from local bicycle stores. Circumstances in which such unexpected correlations occur are referred to herein as "hidden correlations." As described in further detail below, such hidden correlations may be identified through an Eigenvector analysis to find a dominant Eigenvector in a plurality of dimensions.

While one or more correlations between dimensions may result in relatively innocuous conclusions (e.g., users likely to purchase cheese or users that are likely cyclists), some clusters of dimensions may result in the disclosure of information deemed private (e.g., users having a particular medical condition, users in a particular income range, etc.). Example methods, systems, apparatus and/or articles of manufacture disclosed herein establish a privacy rank associated with one or more dimensions and/or a user so that an indication of privacy relevance can be ascertained by the user. Additionally, example methods, systems, apparatus and/or articles of manufacture disclosed herein identify hidden correlations (e.g., dominant Eigenvectors) between dimensions (e.g., privacy values) that may not be readily identified and/or appreciated in view of expected consumer behaviors. Accordingly, such privacy relevance information can allow the user to determine whether one or more dimensions should be revealed or withheld to/from a third party. A privacy rank manager (sometimes referred to herein as a dimension authority) may operate and/or otherwise execute on a client device (e.g., a user personal computer, a user mobile device, etc.) and intercept one or more instances of dimension disclosure. For example, the dimension authority may respond to a user clicking on a "Like" icon on a webpage that is associated with Facebook®. The "Like" icon may be associated with a dimension, such as a type of cell phone. If the disclosure of this dimension to the third party increases a likelihood of the user identity being discovered by a threshold amount, then the example dimension authority may block the "Like" icon and/or inform the user that disclosure of this dimension may result in adverse privacy consequences. For example, in the event engagement of content increases a likelihood of being able to identify the user, one or more notification messages may be provided to the user (e.g., via a pop-up window) recommending that the user not proceed, as disclosed in co-pending U.S. patent application Ser. No. 13/997,918, which is hereby incorporated by reference in its entirety.

FIG. 1 is a schematic illustration of an example privacy rank system 100. In the illustrated example of FIG. 1, the system 100 includes any number of principals 102, a privacy rank manager 104, and a profile database 106 to reveal a ranked list of dimensions. As used herein, a principal is defined to be one or more entities having a dimension. The principal may include one or more users (e.g. a group). The example dimensions in the profile database 106 may be ranked such that a maximum rank corresponds to the dimension that is associated with the largest principal (e.g., the principal having the largest number of users that are members of the dimension). As described above, the population of a dimension (e.g., the membership size (i.e., the number of principal(s))) determines how privacy sensitive that dimension is. Additionally, two or more dimensions may exhibit a relatively high correlation and categorized into one or more clusters. In other words, dimension(s) of a cluster may result in the occurrence and/or observation of a first dimension having a relatively high likelihood of a second dimension occurring and/or otherwise being observed.

Figure 2:
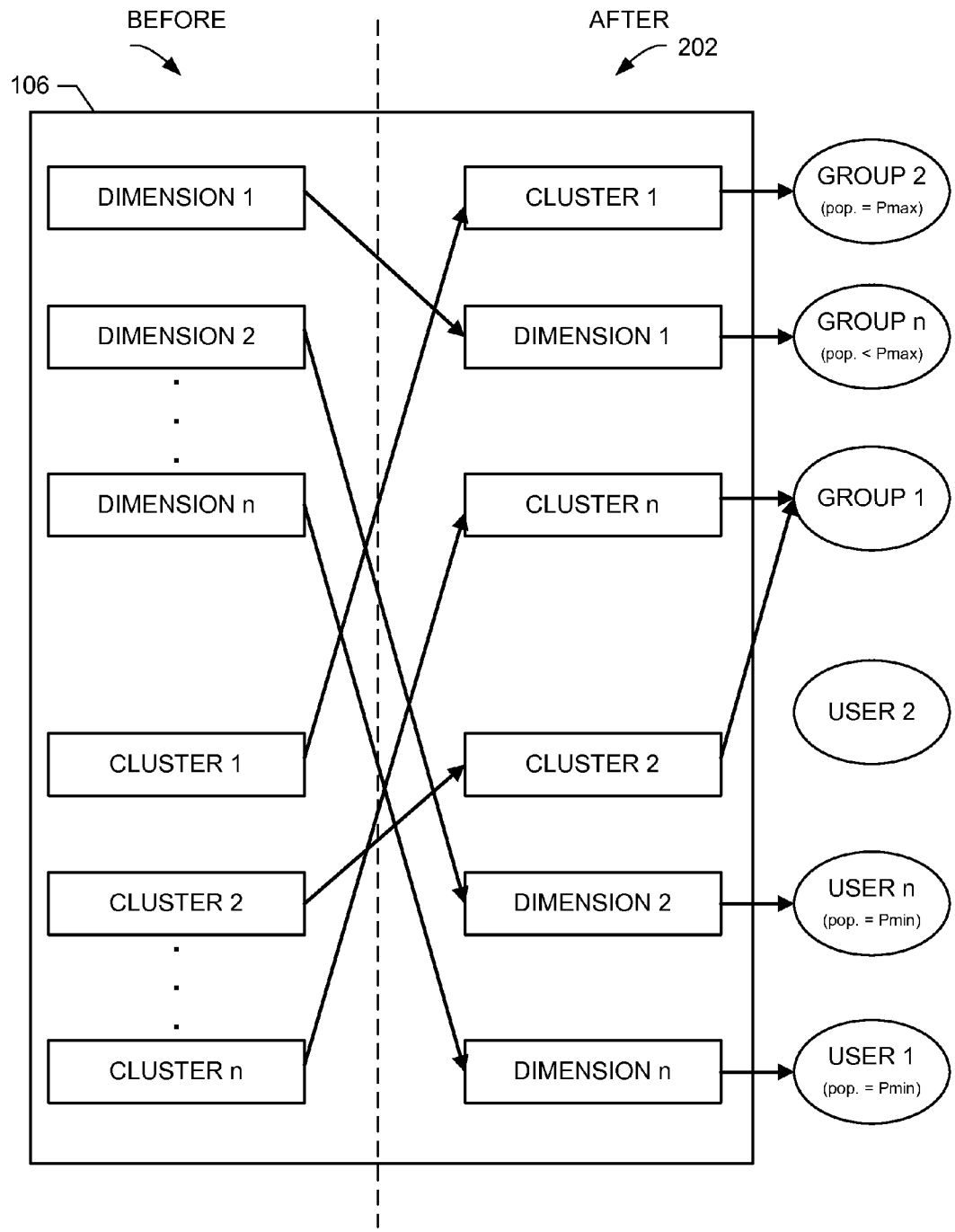
FIG. 2 is a schematic illustration of an example profile database showing a ranking of privacy values.

FIG. 2 is a schematic illustration of an example implementation of the profile database 106 of FIG. 1 shown after the example privacy rank manager 104 has performed at least one ranking process. In the illustrated example of FIG. 2, a rank ordering 202 sorts dimensions and clusters based on a size of their membership(s) (i.e., number of users and/or groups). In the example of FIG. 2, $Cluster_{-1}$ corresponds to the dimensions having the largest associated population, and $Dimension_{-2}$ corresponds to the dimension having the lowest associated population. While $User_{-2}$ does not include one or more associated values, it may be a member of other groups. In response to and/or after generating a ranking of one or more dimensions and/or clusters, privacy management decisions may be applied for one or more users before disclosing an amount of information that may lead to a threshold privacy tolerance value, as disclosed in co-pending U.S. patent application Ser. No. 13/997,918, which is hereby incorporated by reference herein in its entirety.

Figure 3:
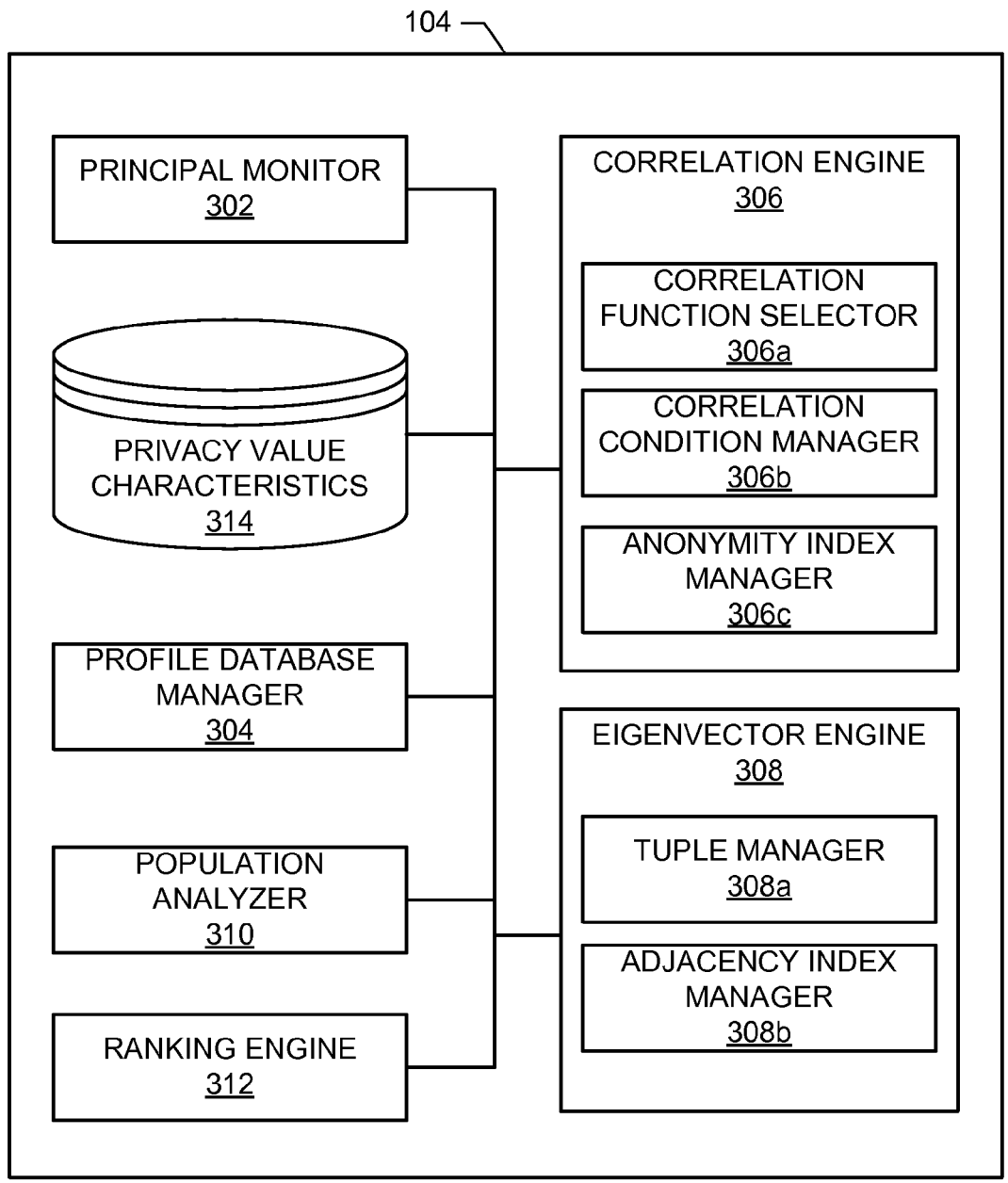
FIG. 3 is a schematic illustration of an example implementation of the example privacy rank manager of FIG. 1.

FIG. 3 is a schematic illustration of an example implementation of the example privacy rank manager 104 of FIG. 1. In the illustrated example of FIG. 3, the privacy rank manager 104 includes a principal monitor 302, a profile database manager 304, a correlation engine 306, an Eigenvector engine 308, a population analyzer 310 and a ranking engine 312. The example correlation engine includes an example correlation function selector 306a, an example correlation condition manager 306b and an example anonymity index manager 306c. The example Eigenvector engine 308 includes an example tuple manager 308a and an example adjacency index manager 308b. In operation, the example principal monitor 302 acquires and/or otherwise monitors for receipt of information from a principal that may be related to one or more privacy concerns. As described above, the example privacy rank manager 104 may operate as a client on a user device (e.g., a personal computer, a wireless device, etc.) and monitor for instances when information is to be released from the user device. In other examples, the privacy rank manager 104 may operate at a remote and/or centralized location that is communicatively connected to user devices, such as user computers connected via a network (e.g., the Internet). For example, if a user web browser includes a "Like" button associated with Facebook®, then the example privacy rank manager 104 may retrieve and/or otherwise receive an indication that principal information could be released.

The example principal monitor 302 detects instances of potential disclosure and determines if the information associated with the principal includes one or more privacy values (V) (dimensions). For example, privacy value information associated with the principal may include an Internet protocol (IP) address, global positioning system (GPS) coordinates, wireless device operating parameters, address information and/or any other type of information that could describe one or more attributes of the principal (e.g., one or more users).

The example profile database manager 304 of FIG. 3 determines whether the privacy value (V) (dimension) that is about to be released is already in the example profile database 106. If so, then the example principal monitor 302 of the illustrated example determines whether the privacy value (V) already in the example profile database 106 is also associated with the current principal of interest. If so, then the size of the principal did not grow and there is no reason to re-calculate the ranking of the profile database 106. In other words, the principal was already observed to be a member (e.g., a participant) associated with the privacy value of interest. On the other hand, if the privacy value (V) already in the example profile database 106 is associated with a different principal, such as a new user, then the example profile database manager 304 may generate a new group or update an existing group using the new and any existing principals as members to be associated with the privacy value (V). In other words, the population count associated with the privacy value (V) increases. Because one or more privacy value (V) population count(s) have changed, the example population analyzer 310 updates the example profile database 106 to reflect the new size information, and the example ranking engine 312 arranges all of the privacy values (e.g., dimensions, clusters) in a new order to reflect the rank changes, if any.

In some examples, the privacy value (V) associated with the current principal of interest is not already in the example profile database 106. In other words, a new privacy value (V) (dimension) is discovered that may influence the potential privacy risk of the current principal. This new privacy value (V) is stored as a new privacy value (V) in the example profile database 106. Upon initial entry into the example profile database 106, the new privacy value (V) is associated with a default lowest rank because only a single principal shares and/or exhibits an association with the new privacy value. The example profile database manager 304 of FIG. 3 determines whether the current principal under consideration has other (e.g., previously stored) privacy values ($V_{PRIOR}$) associated thereto. If not, then the principal monitor 302 of the illustrated example continues to look for additional instances where the current principal may be about to disclose information. On the other hand, if the current principal of interest also has one or more prior privacy value(s) ($V_{PRIOR}$) associated with it, then the example privacy rank manager 104 determines a degree of correlation therebetween. As described above, because knowledge of one privacy value can serve as an indicator to one or more additional attributes of the principal, the example privacy rank manager 104 determines whether certain pairs and/or combinations of privacy values correlate at a relatively high degree. If so, then the example correlation engine 306 of FIG. 3 categorizes the two or more correlated privacy values as candidate cluster values.

Additionally, the possibility exists that one or more other privacy values exhibit hidden correlations unrelated to the current principal of interest. To identify such hidden correlations and reveal one or more clusters of privacy values that co-impute commonality, the example Eigenvector engine 308 of FIG. 3 applies an Eigenvector analysis to tuples of interest as a sparse matrix. Generally speaking, the number of potential permutations of combinations of privacy values can become very large, so the example Eigenvector engine 308 employs an adjacency matrix to drive such permutations with an Eigenvector matrix. An example Eigenvector matrix is shown below as Equation 1.

$$EV=R*L \qquad \text{Equation 1.}$$

In the illustrated example of Equation 1, EV refers to the dominant Eigenvector that results from an Eigenvector analysis, R refers to a matrix of one or more probabilities associated with tuples of interest (probability tuples), and L refers to the adjacency matrix to facilitate all permutations of interest. Identification of a dominant Eigenvector may be indicative of instances where releasing and/or otherwise revealing a particular dimension results in a relatively greater privacy risk.

While an example manner of implementing the privacy rank manager 104 of FIG. 1 is illustrated in FIGS. 1-3, one or more of the elements, processes and/or devices illustrated in FIG. 1-3 may be combined, divided, re-arranged, omitted, eliminated and/or implemented in any other way. Further, the example principal monitor 302, the example profile database manager 304, the example correlation engine 306, the example correlation function selector 306a, the example correlation condition manager 306b, the example anonymity index manager 306c, the example Eigenvector engine 308, the example tuple manager 308a, the example adjacency index manager 308b, the example population analyzer 310, the example ranking engine 312 and/or, more generally, the example privacy rank manager 104 of FIGS. 1 and 3 may be implemented by hardware, software, firmware and/or any combination of hardware, software and/or firmware. Thus, for example, any of the example principal monitor 302, the example profile database manager 304, the example correlation engine 306, the example correlation function selector 306a, the example correlation condition manager 306b, the example anonymity index manager 306c, the example Eigenvector engine 308, the example tuple manager 308a, the example adjacency index manager 308b, the example population analyzer 310, the example ranking engine 312 and/or, more generally, the example privacy rank manager 104 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example principal monitor 302, the example profile database manager 304, the example correlation engine 306, the example correlation function selector 306a, the example correlation condition manager 306b, the example anonymity index manager 306c, the example Eigenvector engine 308, the example tuple manager 308a, the example adjacency index manager 308b, the example population analyzer 310, the example ranking engine 312 and/or, more generally, the example privacy rank manager 104 is/are hereby expressly defined to include a tangible computer readable storage device or storage disk such as a memory, a digital versatile disk (DVD), a compact disk (CD), a Blu-ray disk, etc. storing the software and/or firmware. Further still, the example privacy rank manager 104 of FIGS. 1 and 3 may include one or more elements, processes and/or devices in addition to, or instead of, those illustrated in FIG. 3, and/or may include more than one of any or all of the illustrated elements, processes and devices.

Figure 4:
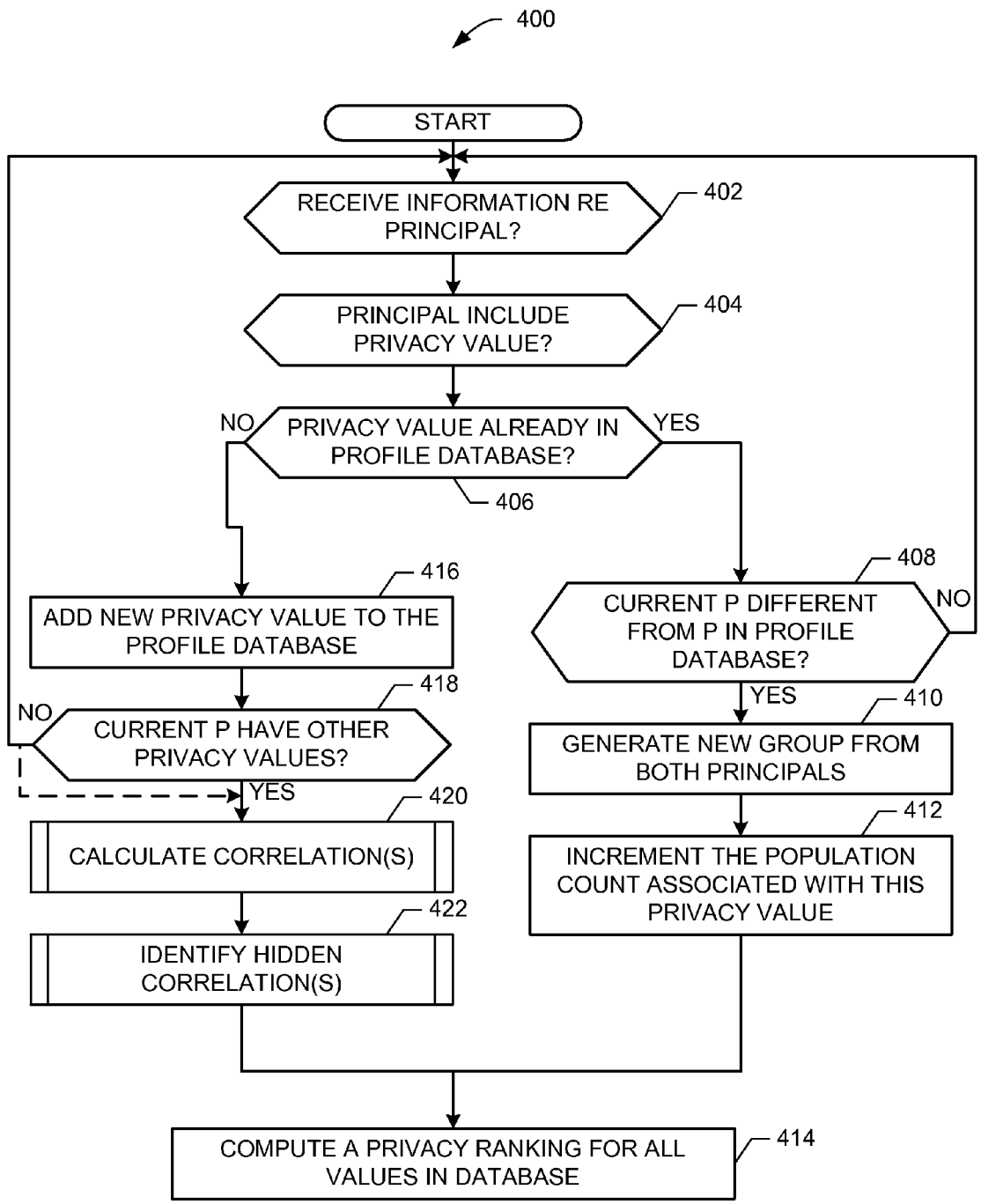
FIGS. 4-6 are flowcharts representative of example machine readable instructions that may be executed to identify privacy relevant correlations between data values.
Figure 5:
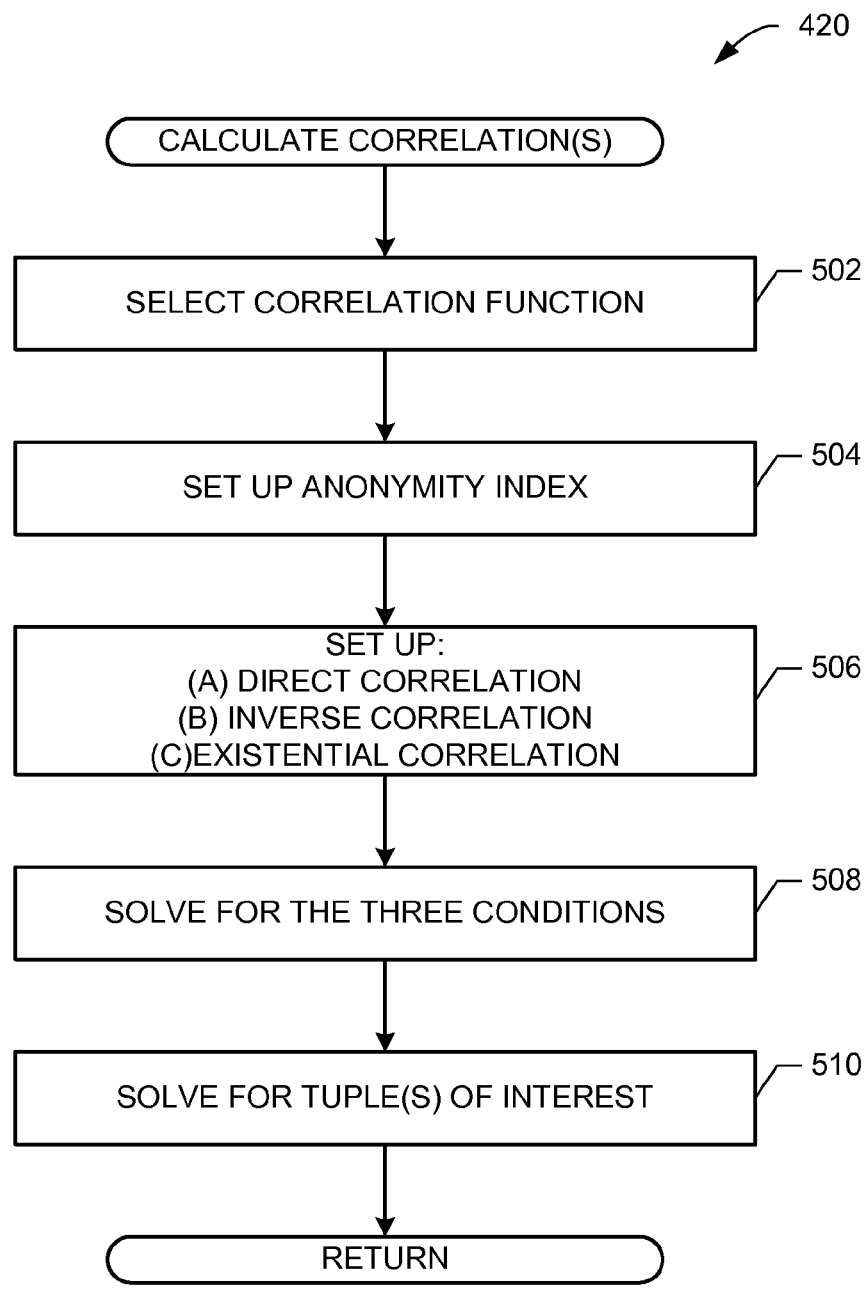
Figure 6:
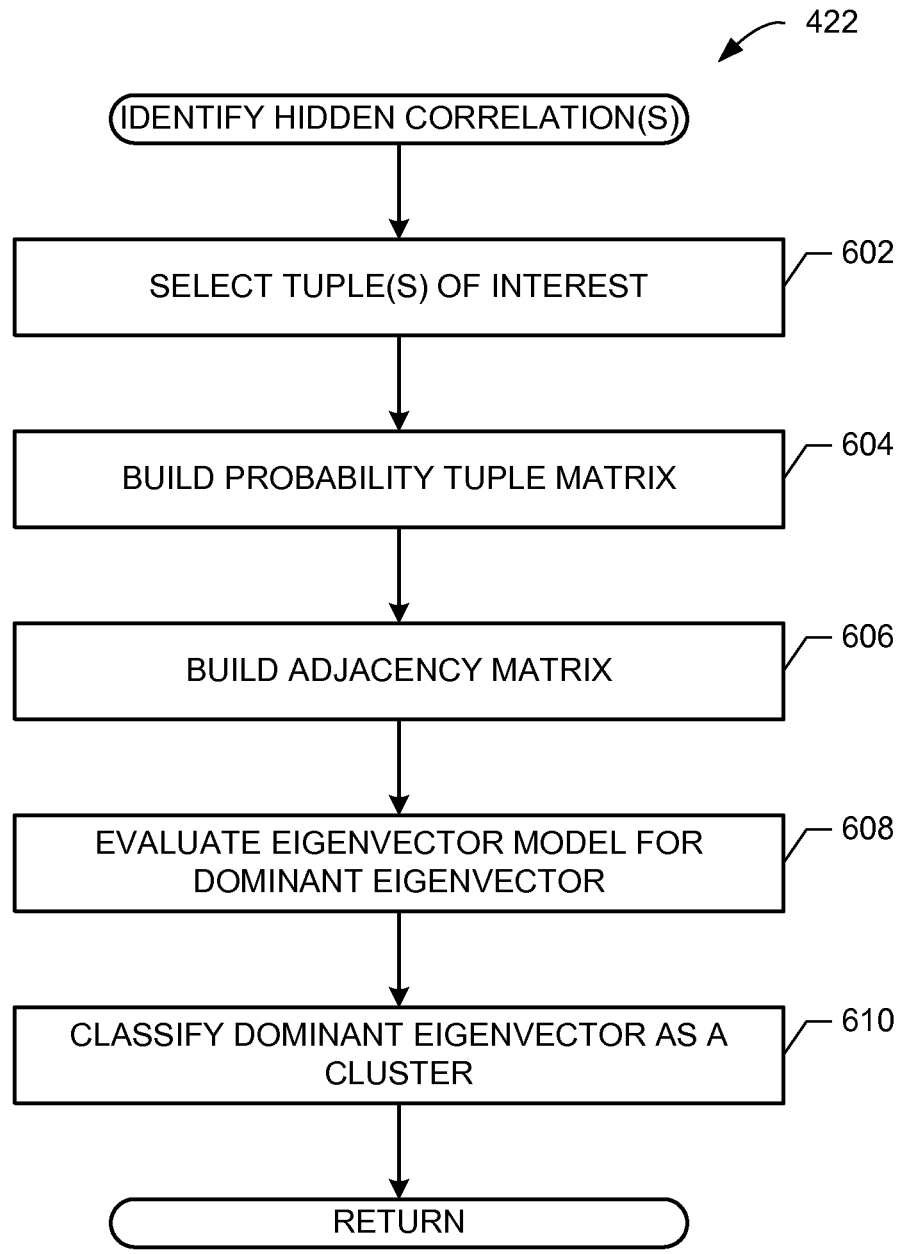

A flowchart representative of example machine readable instructions for implementing the privacy rank manager 104 of FIGS. 1 and 3 are shown in FIGS. 4-6. In these examples, the machine readable instructions comprise one or more programs for execution by a processor such as the processor 712 shown in the example processor platform 700 discussed below in connection with FIG. 7. The program(s) may be embodied in software stored on a tangible computer readable storage medium such as a CD-ROM, a floppy disk, a hard drive, a digital versatile disk (DVD), a Blu-ray disk, or a memory associated with the processor 712, but the entire program(s) and/or parts thereof could alternatively be executed by a device other than the processor 712 and/or embodied in firmware or dedicated hardware. Further, although the example program(s) is/are described with reference to the flowcharts illustrated in FIGS. 4-6, many other methods of implementing the example privacy rank manager 104 may alternatively be used. For example, the order of execution of the blocks may be changed, and/or some of the blocks described may be changed, eliminated, or combined.

As mentioned above, the example processes of FIGS. 4-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 4-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The program 400 of FIG. 4 begins at block 402 where the example principal monitor 302 monitors for receipt of information from a principal that may be targeted for potential disclosure. If the example principal monitor 302 does not observe and/or otherwise detect potential disclosure of information, control returns to block 402 to continue monitoring, otherwise the example principal monitor 302 determines if the information slated for disclosure includes one or more privacy values (V) (block 404). One or more attributes related to privacy values may be stored in the example privacy value characteristics database 314, which is queried by the example principal monitor 302 to look for a match between information to be disclosed and one or more indications of privacy. For example, if the information to be disclosed indicates an age, a birthdate, a name or a pharmaceutical drug, then the example principal monitor 302 queries the example privacy value characteristics database 314 for a match. If a match is not found (block 404), control returns to block 402.

However, in the event the information to be disclosed also includes an element of privacy (block 404), then the example profile database manager 304 queries the example profile database 104 to determine if this privacy value (V) resides therein (block 406). If so, then the example principal monitor 302 determines whether the privacy value already stored within the example profile database 104 (e.g., from a previous iteration of the example program 400) is associated with current principal or a different principal (block 408). If the privacy value already stored within the example profile database 104 is also associated with the current principal of interest (e.g., the principal associated with the current iteration of the program 400), then the membership size of the privacy value (V) did not grow/change, and control returns to block 402. On the other hand, if the privacy value already stored within the example profile database 104 is associated with a different principal (block 408), then the membership size for the privacy value (V) grew, and the example profile database manager 304 generates a new group from both principals as members associated with the privacy value (V) (block 410). To reflect a growing incidence of the privacy value (V), the example profile database manager 304 increments a population count associated with the privacy value (block 412) before performing a ranking operation on the existing profile values and clusters in the example profile database 104 (block 414).

Returning to block 406, if the example profile database manager 304 determines that the privacy value (V) detected by the example principal monitor 302 is absent from the example profile database 104, then the example profile database manager 304 adds the privacy value (V) thereto (block 416). Because the new privacy value (V) is now stored in the example profile database 104, subsequent occurrences of other principals sharing this privacy value will cause an increase in the population associated with the new privacy value (V). As described above, as a population of a privacy value increases (e.g., a relatively larger number of principals share the privacy value), a corresponding privacy threat decreases.

The example profile database manager 304 determines whether the current principal of interest ($P_C$) has other privacy values associated with it (e.g., other privacy values associated with the principal discovered on a prior iteration of the program 400) (block 418). If not, then control returns to block 402 so that the example principal monitor 302 can continue monitoring for instances of information to be released by a user. On the other hand, if the current principal of interest ($P_C$) has other privacy values associated with it (a prior privacy value ($V_P$)), then the example correlation engine 306 calculates a correlation value (e.g., a weight) between the newly discovered privacy value (V) and the previously discovered privacy value ($V_C$) (block 420), as described in further detail below.

In some examples, even though the current principal of interest ($P_C$) associated with newly identified privacy value (V) does not have an previously identified/discovered privacy value(s) (block 418), control may advance to blocks 420 and 422 (see dashed path), as described in further detail below. In other words, while the current principal of interest ($P_C$) has no other privacy value(s), the possibility exists that the newly discovered privacy value (V) is correlated with one or more other privacy value(s) associated with one or more other principal(s). The example Eigenvector analysis described below identifies such hidden privacy values (dimensions).

While any two privacy values result in a correlation weight (e.g., a weight ranging between a value of zero (0) to reflect little to no-correlation, and a value of one (1) to reflect a strong correlation), such privacy value pairs that exhibit a relatively strong correlation may be indicative of a cluster. Generally speaking, a cluster includes two or more privacy values that exhibit a relatively high probability of occurring together. For example, if purchasing milk and purchasing eggs result in a relatively high correlation weight, then observing one of those two activities will result in a high likelihood of observing the other activity. The example correlation engine 306 determines a correlation weight and, if a threshold weight value is met or exceeded, then the example correlation engine 306 associates the current privacy value (V) and the previously discovered privacy value ($V_C$) with a cluster. As one or more additional/new privacy values are discovered, the example correlation engine 306 adds to existing cluster(s) and/or generates new cluster(s) as needed.

In addition to determining clusters based on privacy values associated with the principal of interest, one or more hidden correlations may exist with other combinations of privacy values. Such hidden correlations may occur independently of the principal(s) of interest and/or may not reflect conventional expectations. In other words, while a strong correlation may be expected to exist between consumers that purchase bread and consumers that purchase milk, strong correlations may also occur between consumers that subscribe to cooking magazines and consumers that regularly purchase antacids. To identify if hidden correlations exist between otherwise unexpected privacy values (dimensions), the example Eigenvector engine 308 performs an Eigenvector analysis to identify dominant Eigenvectors from tuple correlations (block 422), as described in further detail below.

FIG. 5 illustrates additional detail associated with calculating correlation values (block 420). As described above, if the current principal of interest ($P_C$) has other privacy values associated with it, such as one or more privacy values associated with the principal that were discovered on a prior instance of a user device disclosing information, then the example correlation function selector 306a selects a correlation function (block 502). In some examples, data is cultivated based on a random sample of participants that agree to answer questions regarding product use, preferences and/or other behaviors. Such cultivated data may be correlated by one or more dimensions and/or weighted. In other examples, data is cultivated by one or more sensors of one or more devices that observe participant behavior during an activity (e.g., using Skype®). Additionally, the one or more sensors may be employed to cultivate background activity to identify where and/or when such activity occurs (e.g., Skype® used at a coffee shop). One or more functions may be employed to identify correlations that may exist between coffee consumption, access to high-bandwidth WiFi and/or social activities. The correlation function selected by the example correlation function selector 306a may be generally implemented in a manner consistent with example Equation 2.

$$C(V_i, V_j) \qquad \text{Equation 2.}$$

In the illustrated example of Equation 2, C reflects a selected correlation function, $V_i$ reflects a first privacy value of interest (e.g., the newly discovered privacy value ($V_C$)), and $V_j$ reflects a second privacy value of interest (e.g., the previously discovered privacy value ($V_P$)). As described above, evaluating the correlation function returns a value between zero (0) and one (1) in which values near zero reflect a relatively weak or non-existent correlation, and values near one reflect a relatively strong correlation between $V_i$ and $V_j$. In view of the possibility that new privacy values may be discovered during any number of iterations of the example program 400, the example correlation function of Equation 2 may be modeled for set expansion to facilitate complex correlation evaluation across any number of dimensions. An example set expansion correlation model may be employed in a manner consistent with example Equation 3.

$$C(C(\ldots C(C(V_1,V_2),V_3),\ldots,V_i),V_j \qquad \text{Equation 3.}$$

The example correlation engine 306 identifies an anonymity index that reflects a probability of the principal of interest and the privacy values ($V_i$, $V_j$) will remain anonymous for some value between zero (0) and one (1). For each tuple (T) of interest, which includes a combination of a principal of interest and a corresponding privacy value of interest, the example anonymity index manager 306c sets up an anonymity index model (block 504) in a manner consistent with example Equation 4.

$$PR(T_i)=(PR(P_i)*PR(V_i)) \qquad \text{Equation 4.}$$

In the illustrated example of Equation 4, PR reflects a probability function, $T_i$ reflects a tuple, and $PR(P_i)$ and $PR(V_i)$ are represented in a manner consistent with example Equations 5 and 6, respectively.

$$PR(P_i) = 1 - \left(\frac{1}{(\text{Cardinality }(P_i))}\right). \qquad \text{Equation 5}$$

$$PR(V_i) = C(V_i, V_j), C(V_j, V_i), C(V_i, \emptyset). \qquad \text{Equation 6}$$

In the illustrated example of Equation 5, the example correlation engine 306 calculates a probability of a principal based on a plurality of principals in a set of interest. Additionally, in the illustrated example of Equation 6, the example correlation condition manager 306b sets up a correlation possibility set. The correlation possibility set includes three potential correlation conditions (e.g., correlation types) that could occur (block 506), in which C(Vi, Vj) reflects a direct correlation applied to two vectors (e.g., privacy values) of interest, C(Vj, Vi) reflects the correlation applied to the reverse correlation scenario (the inverse correlation), and C(Vi,ϕ) reflects the existential correlation. Every value that may exist independently of any other value is referred to as existential, in which case a correlation does not need to be calculated and results in a value of 1. However, the example correlation condition manager 306b considers all three possible correlation conditions when solving for the anonymity index (block 508). A generalized form of the anonymity index from example Equation 4 is shown below as example Equations 7 and 8.

$$PR(T)=PR(T_1)+PR(T_2)+,\ldots,+PR(T_N) \qquad \text{Equation 7.}$$

$$PR(T)=\Sigma_{i=1}^{N}PR(T_i) \qquad \text{Equation 8.}$$

The example anonymity index manager 306c solves for any number of tuples of interest (block 510).

FIG. 6 illustrates additional detail associated with identifying a dominant Eigenvector (block 422). As described above, to determine if hidden correlations exist between two or more dimensions, such as dimensions that may not comport with conventional expectations of correlated behavior, example methods, systems, apparatus and/or articles of manufacture disclosed herein employ an Eigenvector analysis of the tuples of interest. The example Eigenvector engine 308 evaluates an example Eigenvector matrix in a manner consistent with example Equation 1, shown above. The example tuple manager 308a of the example Eigenvector engine 308 selects probabilities associated with tuples of interest (probability tuples) (block 602), such as combinations of principals and their corresponding privacy value(s). The selected probability tuples are arranged and/or otherwise built into matrix R (block 604) in a manner consistent with example Equation 9.

$$R = [PR(T_1),$$
$$PR(T_2),$$
$$PR(T_3),$$
$$\ldots$$
$$PR(T_N)]  \quad \text{Equation 9.}$$

In the illustrated example of Equation 9, N reflects a number of tuples (T) of interest.

To facilitate an exhaustive search of all possible combinations of relationships between the tuples (T) of interest, the example adjacency index manager 308b builds an adjacency matrix (L) (block 606) in a manner consistent with example Equation 10.

$$L = [l(T_1, T_1), l(T_1, T_2), \ldots, l(T_1, T_N)]$$
$$[l(T_2, T_1), l(T_2, T_2) \ldots, l(T_2, T_N)]$$
$$[\ldots]$$
$$[l(T_N, T_1), l(T_N, T_2), \ldots, l(T_N, T_N)] \quad \text{Equation 10.}$$

In the illustrated example of Equation 10, matrix L reflects a large and sparse matrix, thereby allowing all potential combinations of privacy values to be considered when searching for hidden correlations. Additionally, evaluation of l(Ti, Tj) is performed by the example adjacency index manager 308b in a manner consistent with example Equation 11.

$$l(T_i, T_j) = (PR(P_i) * PR(V_i)) * (PR(P_j) * PR(V_j)) \quad \text{Equation 11.}$$

The example Eigenvector engine evaluates the Eigenvector matrix of example Equation 1 to identify a dominant Eigenvector, which is indicative of at least one pair of privacy values that exhibit the highest relative correlation (block 608). In other words, the solution to example Eigenvector matrix of Equation 1 identifies hidden correlations, which may be associated with one or more clusters (block 610).

Figure 7:
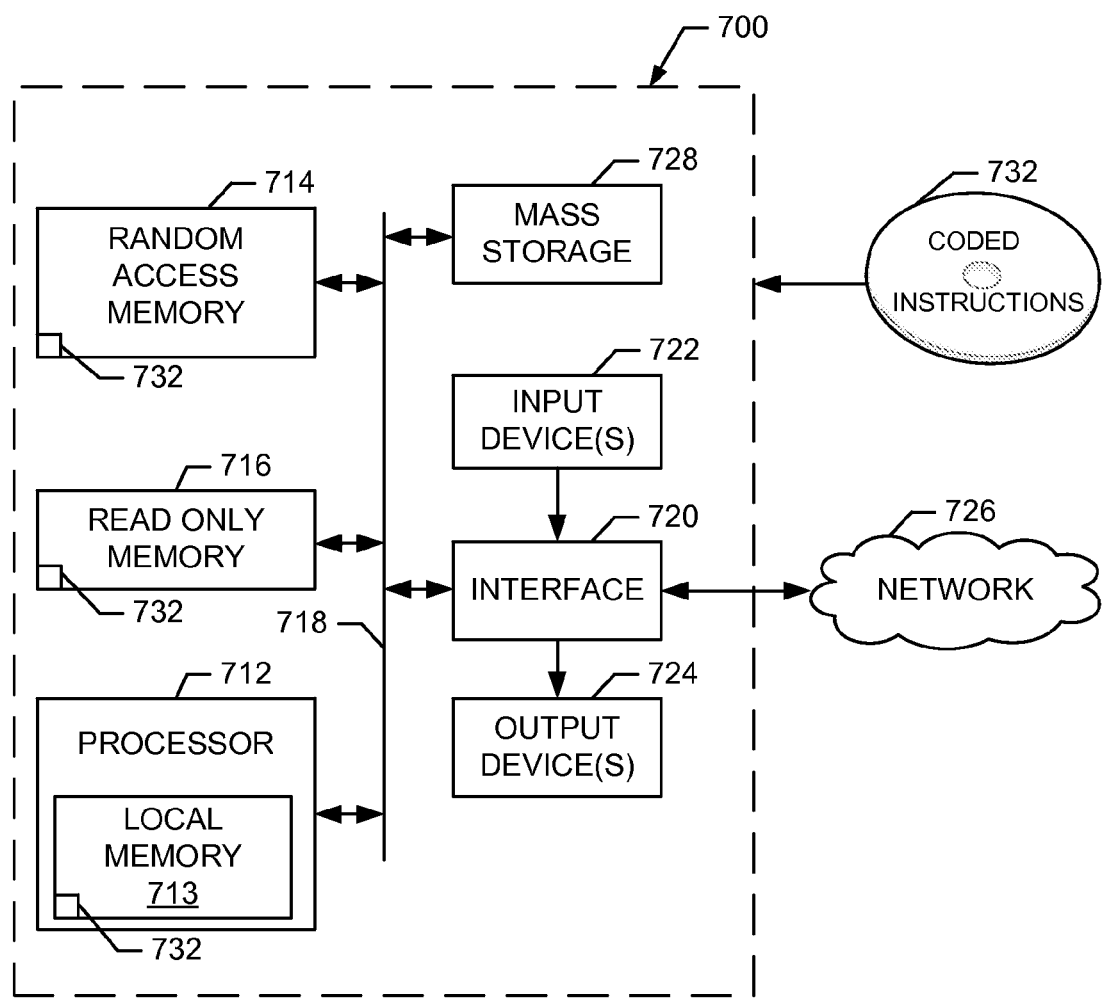
FIG. 7 is a schematic illustration of an example processor platform that may execute the instructions of FIGS. 4, 5 and/or 6 to implement the example privacy rank manager of FIGS. 1 and/or 3.

FIG. 7 is a block diagram of an example processor platform 700 capable of executing the instructions of FIGS. 4-6 to implement the privacy rank manager 104 of FIGS. 1 and 3. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 1012. The input device(s) can be implemented by, for example, an audio sensor, a microphone, a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a light emitting diode (LED), a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 4-6 may be stored in the mass storage device 728, in the volatile memory 714, in the non-volatile memory 716, and/or on a removable tangible computer readable storage medium such as a CD or DVD.

From the foregoing, it will be appreciated that the above disclosed methods, systems, apparatus and/or articles of manufacture identify one or more pairs of privacy values that may be used to impute the existence of each other when only one of the two privacy values is disclosed by a user concerned with his or her privacy. In some examples, two separate privacy values may not be expected to impute the existence and/or occurrence of the other, and example methods, apparatus, systems and/or articles of manufacture disclosed herein apply an Eigenvector analysis to confirm whether two or more privacy values exhibit relatively high correlation values. Such identification of relatively high correlation values (e.g., hidden correlations) are particularly useful for users concerned with disclosing too much privacy information that may be used by third parties for marketing, telemarketing and/or nefarious purposes.

An example disclosed apparatus to identify correlated privacy values includes a principal monitor to identify a first privacy value associated with a first principal, a tuple manager to build a probability tuple matrix comprising a first tuple and a plurality of second tuples, the first tuple comprising the first principal and the associated first privacy value, and an Eigenvector engine to evaluate the probability tuple matrix to identify a dominant Eigenvector indicative of a correlation between the first privacy value and one of the plurality of second tuples. In some examples, the first principal includes at least one of a user or a group of users associated with the first privacy value. In other examples, an anonymity index manager is to generate an anonymity index value based on the first tuple. In still other examples, the anonymity index manager is to evaluate the anonymity index value for a probability that the first principal and the first privacy value will remain anonymous in response to identifying the first privacy value. Some examples include a correlation engine to calculate a probability of occurrence of the first principal based on a plurality of second principals of interest. Other examples include a correlation condition manager to calculate a correlation possibility set to evaluate one or more correlation types, in which the correlation condition manager is to calculate the correlation possibility set based on a direct correlation, an inverse correlation and an existential correlation. In still other examples, the correlation condition manager is to calculate the correlation possibility set based on at least one of the direct correlation, the inverse correlation or the existential correlation. Other examples include the tuple manager to calculate the first tuple based on a product of a probability of occurrence of the first principal and a probability of the first privacy value, while still other examples include an adjacency index manager to generate a matrix of tuple combinations of the first tuple and the plurality of second tuples. In still other examples, a ranking engine is to apply a rank to the first privacy value relative to a plurality of second privacy values, in which the ranking engine is to associate the rank with the first privacy value based on a quantity of principals sharing the first privacy value. Some examples include identifying the dominant Eigenvector to determine an indication of a privacy risk, while in other examples the probability tuple matrix includes a probability of the first principal based on a Cardinality set of principals.

An example method includes identifying a first privacy value associated with a first principal, building a probability tuple matrix that includes a first tuple and a plurality of second tuples, the first tuple including the first principal and the associated first privacy value, and evaluating the probability tuple matrix to identify a dominant Eigenvector indicative of a correlation between the first privacy value and one of the plurality of second tuples. In some example methods, the first principal includes at least one of a user or a group of users associated with the first privacy value. Other example methods include generating an anonymity index value based on the first tuple, and/or evaluating the anonymity index value for a probability that the first principal and the first privacy value will remain anonymous in response to identifying the first privacy value. Some methods also include calculating a probability of occurrence of the first principal based on a plurality of second principals of interest, and/or calculating a correlation possibility set to evaluate one or more correlation types. Still other methods include calculating the correlation possibility set based on a direct correlation, an inverse correlation and an existential correlation, in which the correlation possibility set is calculated based on at least one of the direct correlation, the inverse correlation, or the existential correlation. Still further example methods include calculating the first tuple based on a product of a probability of occurrence of the first principal and a probability of the first privacy value and/or generating a matrix of tuple combinations of the first tuple and the plurality of second tuples. Other example methods include applying a rank to the first privacy value relative to a plurality of second privacy values and/or associating the rank with the first privacy value based on a quantity of principals sharing the first privacy value. Some methods include identifying the dominant Eigenvector comprises an indication of a privacy risk and/or methods in which the probability tuple matrix includes a probability of the first principal based on a Cardinality set of principals.

Example tangible computer readable storage mediums are disclosed herein having instructions stored thereon that, when executed, cause a machine to identify a first privacy value associated with a first principal, build a probability tuple matrix comprising a first tuple and a plurality of second tuples, the first tuple including the first principal and the associated first privacy value, and evaluate the probability tuple matrix to identify a dominant Eigenvector indicative of a correlation between the first privacy value and one of the plurality of second tuples. Some example storage mediums include instructions to generate an anonymity index value based on the first tuple and/or to evaluate the anonymity index value for a probability that the first principal and the first privacy value will remain anonymous in response to identifying the first privacy value. Other example storage mediums include instructions to calculate a probability of occurrence of the first principal based on a plurality of second principals of interest, and/or to calculate a correlation possibility set to evaluate one or more correlation types. In some examples, the instructions cause the machine to calculate the correlation possibility set based on a direct correlation, an inverse correlation and an existential correlation, while in other examples the instructions cause the machine to calculate the first tuple based on a product of a probability of occurrence of the first principal and a probability of the first privacy value. Other examples cause the machine to generate a matrix of tuple combinations of the first tuple and the plurality of second tuples, while still other examples cause the machine to apply a rank to the first privacy value relative to a plurality of second privacy values. Some example instructions cause the machine to associate the rank with the first privacy value based on a quantity of principals sharing the first privacy value.

Example systems to identify correlated privacy values disclosed herein include means for identifying a first privacy value associated with a first principal, means for building a probability tuple matrix comprising a first tuple and a plurality of second tuples, the first tuple including the first principal and the associated first privacy value, and means for evaluating the probability tuple matrix to identify a dominant Eigenvector indicative of a correlation between the first privacy value and one of the plurality of second tuples. Other example systems include means for generating an anonymity index value based on the first tuple, means for evaluating the anonymity index value for a probability that the first principal and the first privacy value will remain anonymous in response to identifying the first privacy value, and/or means for calculating a probability of occurrence of the first principal based on a plurality of second principals of interest. Still other example systems disclosed herein include means for calculating a correlation possibility set to evaluate one or more correlation types, means for calculating the correlation possibility set based on a direct correlation, an inverse correlation and an existential correlation, and/or means for calculating the first tuple based on a product of a probability of occurrence of the first principal and a probability of the first privacy value. Some example systems disclosed herein include means for generating a matrix of tuple combinations of the first tuple and the plurality of second tuples, means for applying a rank to the first privacy value relative to a plurality of second privacy values, and/or means for associating the rank with the first privacy value based on a quantity of principals sharing the first privacy value.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to identify correlated privacy values, comprising:
    a principal monitor to identify a first privacy value associated with a first principal;
    a tuple manager to build a probability tuple matrix including a first tuple and a plurality of second tuples, the first tuple including the first principal and the associated first privacy value;
    an anonymity index manager to determine, based on the first tuple, a probability that the first principal and the first privacy value will remain anonymous in response to disclosing the first privacy value; and
    a privacy rank manager to, when the probability satisfies a privacy threshold, block the disclosure of the first privacy value, the privacy threshold indicative that the first principal and the first privacy value will not remain anonymous in response to disclosing the first privacy value, at least one of the principal monitor, the tuple manager, the anonymity index manager, or the privacy rank manager including a logic device.

2. An apparatus as defined in claim 1, wherein the first principal includes at least one of a user or a group of users associated with the first privacy value.

3. An apparatus as defined in claim 1, further including a correlation engine to calculate a probability of occurrence of the first principal based on a plurality of second principals of interest.

4. An apparatus as defined in claim 1, further including a correlation condition manager to calculate a correlation possibility set to evaluate a correlation type.

5. An apparatus as defined in claim 1, wherein the tuple manager is to calculate the first tuple based on a product of a probability of occurrence of the first principal and a probability of occurrence of the first privacy value.

6. An apparatus as defined in claim 1, further including a ranking engine to apply a rank to the first privacy value relative to a plurality of second privacy values.

7. An apparatus as defined in claim 6, wherein the ranking engine is to associate the rank with the first privacy value based on a quantity of principals sharing the first privacy value.

8. A method to identify correlated privacy values, comprising:
    identifying, with a processor, a first privacy value associated with a first principal;
    building, with the processor, a probability tuple matrix including a first tuple and a plurality of second tuples, the first tuple including the first principal and the associated first privacy value;
    determining, with the processor, based on the first tuple, a probability that the first principal and the first privacy value will remain anonymous in response to disclosing the first privacy value; and
    when the probability satisfies a privacy threshold indicating that the first principal and the first privacy value will not remain anonymous in response to disclosing the first privacy value, blocking, with the processor, the disclosure of the first privacy value.

9. A method as defined in claim 8, further including calculating a probability of occurrence of the first principal based on a plurality of second principals of interest.

10. A method as defined in claim 8, further including calculating a correlation possibility set to evaluate a correlation type.

11. A method as defined in claim 10, further including calculating the correlation possibility set based on a direct correlation, an inverse correlation and an existential correlation.

12. A method as defined in claim 8, further including calculating the first tuple based on a product of a probability of occurrence of the first principal and a probability of occurrence of the first privacy value.

13. A method as defined in claim 8, further including generating a matrix of tuple combinations of the first tuple and the plurality of second tuples.

14. A method as defined in claim 8, further including applying a rank to the first privacy value relative to a plurality of second privacy values.

15. A method as defined in claim 14, further including associating the rank with the first privacy value based on a quantity of principals sharing the first privacy value.

16. A tangible computer readable storage device or storage disk comprising instructions that, when executed, cause a machine to, at least:
    build a probability tuple matrix including a first tuple and a plurality of second tuples, the first tuple including a first principal and an associated first privacy value;
    determine, based on the first tuple, a probability that the first principal and the first privacy value will remain anonymous in response to disclosing the first privacy value; and
    when the probability satisfies a privacy threshold indicating that the first principal and the first privacy value will not remain anonymous in response to disclosing the first privacy value, block the disclosure of the first privacy value.

17. A storage device or storage disk as defined in claim 16, wherein the instructions cause the machine to calculate a probability of occurrence of the first principal based on a plurality of second principals of interest.

18. A storage device or storage disk as defined in claim 16, wherein the instructions cause the machine to calculate a correlation possibility set to evaluate a correlation type.

19. A storage device or storage disk as defined in claim 18, wherein the instructions cause the machine to calculate the correlation possibility set based on a direct correlation, an inverse correlation and an existential correlation.

20. An apparatus as defined in claim 1, further including an Eigenvector engine to evaluate the probability tuple matrix to identify a dominant Eigenvector indicative of a correlation between the first privacy value and one of the plurality of second tuples.

21. An apparatus as defined in claim 4, wherein the correlation condition manager is to calculate the correlation possibility set based on a direct correlation, an inverse correlation and an existential correlation.

22. A method as defined in claim 8, further including evaluating the probability tuple matrix to identify a dominant Eigenvector indicative of a correlation between the first privacy value and one of the plurality of second tuples.

23. A method as defined in claim 8, wherein the first principal is at least one of a user or a group of users associated with the first privacy value.

24. A storage device or storage disk as defined in claim 16, wherein the instructions cause the machine to evaluate the probability tuple matrix to identify a dominant Eigenvector indicative of a correlation between the first privacy value and one of the plurality of second tuples.

25. A storage device or storage disk as defined in claim 16, wherein the first principal is at least one of a user or a group of users associated with the first privacy value.

26. A storage device or storage disk as defined in claim 16, wherein the instructions cause the machine to calculate the first tuple based on a product of a probability of occurrence of the first principal and a probability of occurrence of the first privacy value.

27. A storage device or storage disk as defined in claim 16, wherein the instructions cause the machine to apply a rank to the first privacy value relative to a plurality of second privacy values.

28. A storage device or storage disk as defined in claim 27, wherein the instructions cause the machine to associate the rank with the first privacy value based on a quantity of principals sharing the first privacy value.

* * * * *